Dec. 16, 1947.  H. V. ALEXANDERSSON ET AL  2,432,500
EARTH INDUCTOR GENERATOR
Filed July 1, 1942   3 Sheets-Sheet 1

INVENTOR.
Harald Valdemar Alexandersson
Adolf Stellan Dahlstedt
BY
Jarvis C. Mackey
ATTORNEY Dec. 16, 1947. H. V. ALEXANDERSSON ET AL 2,432,500
EARTH INDUCTOR GENERATOR
Filed July 1, 1942 3 Sheets—Sheet 3

Patented Dec. 16, 1947

2,432,500

UNITED STATES PATENT OFFICE 2,432,500

EARTH INDUCTOR GENERATOR

Harald Valdemar Alexandersson and Adolf Stellan Dahlstedt, Lid'ngo, Sweden, assignors to Aga-Baltic Aktiebolag, Stockholm, Sweden, a corporation of Sweden Application July 1, 1942, Serial No. 449,365
In Sweden April 21, 1942

4 Claims. (Cl. 171—209)

Our invention relates to navigation instruments and more particularly to a gyrostabilized earth inductor compass having novel and improved characteristics.

In the earth induction compasses and similar course-indicating navigation instruments hitherto known, an electrically conducting loop has been rotated in the earth's magnetic field to induce a voltage which varies with the component of the earth's magnetic field perpendicular to the axis of rotation of the loop. These induction compasses, however, have two distinct disadvantages. First, the voltage obtained in the rotating loop is extremely weak, necessitating the use of the most sensitive and expensive instruments for measuring the voltage. Secondly, changes of direction in the vicinity of the north-south direction cause only small changes in induced voltage.

It has also been proposed to produce a voltage sufficiently strong for reliable measurements by utilizing a ferro-magnetic path, preferably with high permeability, for concentrating the field cut by the loop. A higher degree of precision is also obtained by polarizing the magnetic field in such a way, that a field distribution similar to a cardioid is obtained. Such arrangements, however, have not given sufficient precision and besides they have been subject to the disadvantage of too great a declination if the polarizing field intensity does not have the proper value in relation to the field intensity of the earth's magnetism.

In order to avoid these disadvantages we have arranged two parallel units, each of which generates an electrical voltage due to the earth magnetism concentrated to a magnetic path, the magnetic paths being polarized in opposite directions. In this manner output voltages are obtained from each of the units which vary with the direction in which the magnetic path is oriented, the characteristics closely approaching the form of a cardioidic curve. The two cardioidic curves, however, are turned in opposite directions due to the opposite polarization and the voltages become equal when the magnetic paths are oriented in east-west direction.

Instruments of the last mentioned type should operate with the rotating parts rotating at high speed. Hence the rotating parts should have small dimensions, they should be rigid against outer strains, and should have low air resistance against the rotation.

The present invention relates to an arrangement, by which these requirements are satisfied, and certain other advantages are also gained, such as a small space, small weight, cheapness and simplicity of manufacture.

According to the invention both of the magnetic circuits are arranged in such a way that their rotating parts are formed by a single member common to both of the magnetic circuits, the fixed parts in the respective circuits preferably being arranged in the same plane. These fixed parts are preferably arranged substantially radially in relation to the rotating shaft of the common rotor.

The invention may be used in a plurality of different types of navigation instruments, such as induction compasses, course navigation instruments, automatic navigation systems, automatic pilots, etc. It is described herein in connection with a course navigation instrument, but it is to be understood that it is not limited to use in connection with such an instrument. On the annexed drawing.

Figure 1:
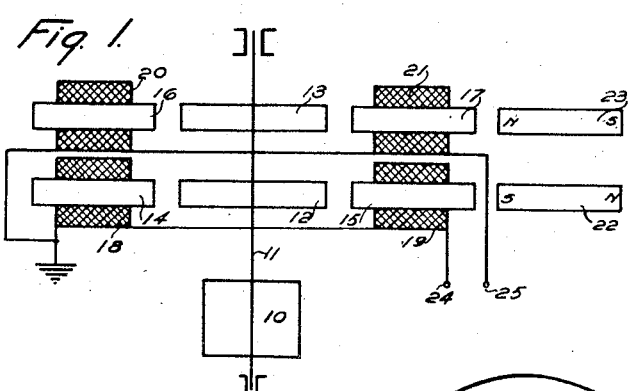
Fig. 1 is a diagrammatic sketch of the electromagnetic parts of an instrument embodying the present invention.

In Fig. 1, 10 indicates the rotor part of a gyroscope having a shaft 11. On the same shaft are mounted the rotors 12 and 13 of the units for generating the measuring voltage. The rotors 12 and 13 may be in the form of bars or any other suitable type such that their rotation causes the field which passes through the cores 14—15 and 16—17 due to the earth's magnetism to vary. These cores carry electrical windings 18, 19, 20 and 21, the windings 18 and 19 being connected in series, and the windings 20 and 21 being connected in series. Finally two permanent magnets (or electromagnets) 22 and 23 are arranged for polarizing the magnetic circuits 14—12—15 and 16—13—17, respectively. These magnets are opposed.

Figure 2:
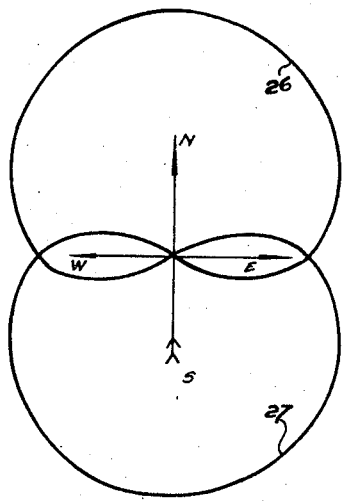
Fig. 2 is a diagram for explaining the operation of the parts shown in Fig. 1.

One terminal of the series connected windings is connected to ground and the other terminals 24, 25 are each connected to a rectifier, which is not shown in Fig. 1 but may be assumed to be connected to the terminals 24 and 25, respectively. The direct current voltages obtained from the rectifiers are compared with each other in a suitable instrument, the character of which is no part of the present invention. These two voltages, however, become equal when the magnetic circuits 14—12—15 and 16—13—17 are oriented in a predetermined magnetic direction, which will be the east-west direction if the circuits are similarly arranged. Fig. 2 shows how the voltage in each of the circuits varies with the geographical direction. The diagram 26 represents the voltage which is obtained after rectification of the voltage from the coils 18—19, whereas the diagram 27 represents the voltage after rectification from the coils 20—21.

Figure 3:
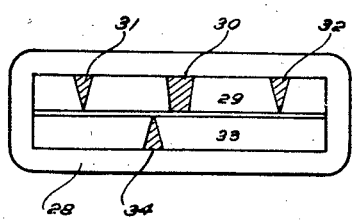
Fig. 3 is a detail view of the indicating part of the instrument.

An indication of the orientation of the magnetic circuits may be obtained by connecting the rectified voltages in series opposition. The resultant should be zero when the magnetic circuits are in east-west direction. This resultant may be fed to a direct-current-indicating instrument, preferably a moving-coil instrument, which thus indicates the orientation of the magnetic circuits. The scale part of such an instrument is shown in Fig. 3. Usually the instrument is provided with a frame 28, within which the scales are visible. The instrument may contain one fixed scale 29 which may be provided with an indication mark 30 and two side marks 31 and 32 which indicate the greatest allowed side-displacement. Another scale 33 is movable by means of the above mentioned instrument and contains a single mark 34 which should be maintained as nearly as possible coinciding with the fixed indication mark 30. In the figure the mark 34 has been shown in a position where it indicates a small deviation to port.

Figure 6:
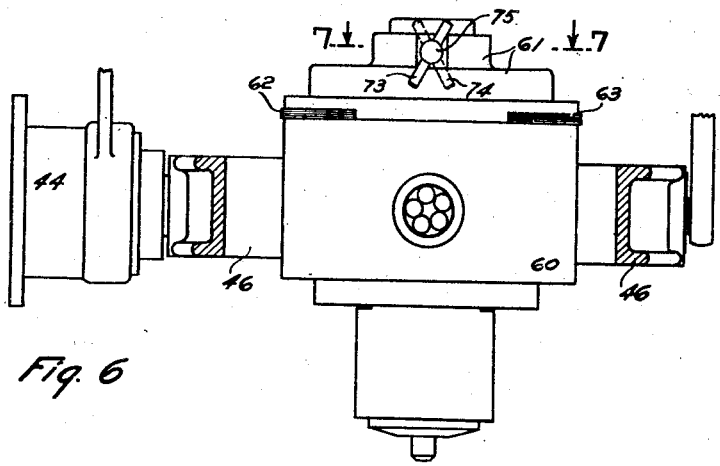
Fig. 6 is a side elevation of the generator.

As mentioned above, Fig. 1 shows only the principle of an instrument embodying the present invention. A practical form of this instrument is shown in Figs. 4, 5 and 6.

Figure 4:
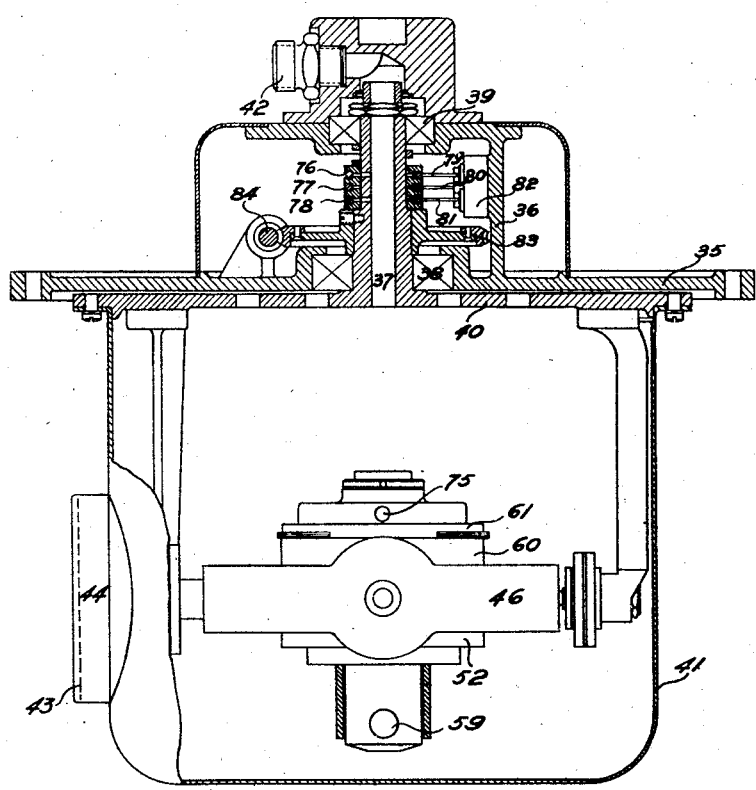
Fig. 4 is a side elevation, partly in section, showing the gyroscope and generator.
Figure 5:
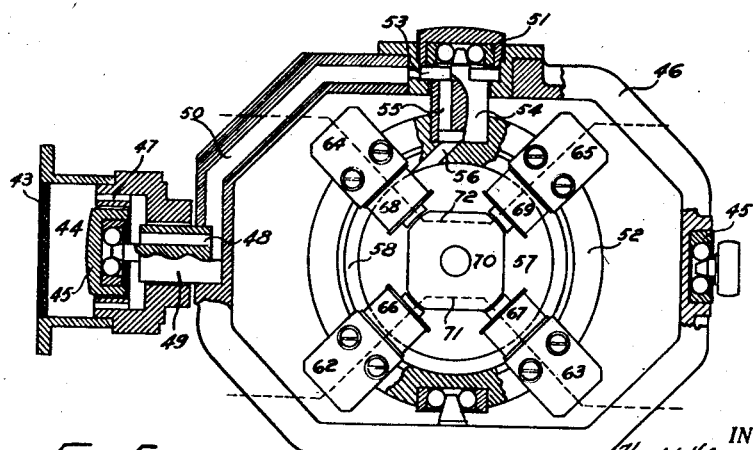
Fig. 5 is a top plan view of the generator partly in section.

In Fig. 4 the chassis plate of the instrument is indicated as 35. On the chassis plate 35 is mounted a bearing housing 36 carrying ball-bearings 38 and 39 in which a shaft 37 is journaled. The shaft 37 is formed as a plate 40 at its lower end, carrying an airtight case 41 within which is mounted the gyroscope and the earth inductor generator. For driving the gyroscope, vacuum or subatmospheric pressure is used which is produced by a suction-pump connected to a connection 42. The shaft 37 is hollow in order to transmit this suction to the inner parts of the case 41. For letting in air in order to drive the gyroscope there is further provided a chamber 44 and a filter 43 in the wall of the case 41, as shown in Fig. 5.

The chamber 44 carries the bearing arrangement 45 of the outer gimbal ring 46 for hanging the gyroscope. Air is supplied through openings 47 in one of the bearings 45 and a channel 48 in the shaft bolt 49 and a further channel 50 in the gimbal ring 46 to the bearing 51 for the inner gimbal ring 52. This bearing 51 is provided with openings 53, and the shaft bolt 54 of the inner gimbal ring 52 is also provided with a hole 55 which supplies air to a blowpipe 56 in the ring 52. From the blowpipe 56 air will be impressed on to the turbine wheel 57 which constitutes the rotor part in the gyroscope. From the turbine wheel 57 the air is removed through a ring-shaped channel 58 in the inner gimbal ring, said channel communicating with the interior of the case 41 by channels which are not visible on the drawings but which extend perpendicularly to the plane of the paper in Fig. 5.

These channels communicate with an opening 59 on the inner gimbal ring, see Fig. 4.

The turbine is shown at 60 in Fig. 4. The generator 61 is built in one side wall of the turbine. The construction of the generator will be better seen from Fig. 5. It contains four radially placed magnet cores 62, 63, 64, and 65, each of which carries a winding 66, 67, 68 and 69, respectively. The four magnets correspond to the bars 14, 15, 16 and 17, respectively, in Fig. 1, whereas the windings correspond to the windings 18, 19, 20 and 21 in Fig. 1. The four magnet cores, in the arrangement according to Fig. 5, are placed in the same plane, and a common magnetic part 70 is provided instead of the two rotating magnetic parts 12 and 13 in Fig. 1. The part 70 is substantially square with the four corners machined, so that they pass the pole pieces of the four magnets 62—65 with a constant air-gap, these magnets are mutually displaced by 90° and lie in the same plane.

Figure 7:
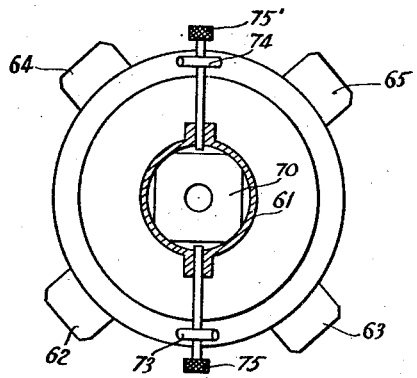
Fig. 7 is a transverse section taken on line 7—7 of Fig. 6.

The magnetic paths are closed as shown by the dotted lines 71 and 72, respectively, in Fig. 5. For polarization of the magnetic cores 62—65 two permanent magnets 73 and 74 are provided corresponding to the magnets 22 and 23 in Fig. 1. These are visible in Figs. 6 and 7. For adjustment they are connected to two screws 75 and 75', which penetrate the case of the housing 61, see Fig. 6, which is made of non-magnetic material, these screws 75, 75' being visible in Figure 7.

The magnets 73 and 74 are rotatable by means of their adjusting screws so that the polarization may be adjusted to the correct value. This produces two different advantages. First, by adjustment of the position of one of the magnets, both characteristic curves in Fig. 2 may be made fully symmetrical, a necessary condition if the arrangement is to show the true course. Secondly, by increasing or decreasing its inclination of the two magnets simultaneously the magnitude of the voltage generated may be adjusted to obtain different sensitivities so that the course deviation represented by the marks 31 or 32 of Fig. 3 may be varied as desired. The adjustment of the magnets is preferably made by alternately connecting each of the electric circuits first to its own rectifier and then to the rectifier of the other circuit. The same polarizing field intensity is obtained when the reading is the same in both cases.

The electric conductors from the generator are connected to three collecting rings 76, 77 and 78 on the shaft 37, with which three brushes 79, 80 and 81 cooperate. These are mounted on an insulating plate 82.

When the instrument is to be used as a course navigation instrument, the brushes 79, 80 and 81 are connected to the two above mentioned rectifiers, the voltages of which are caused to actuate the scale 33, see Fig. 3. It is obvious, that the magnets 62—65 may also be arranged in a predetermined position with relation to the longitudinal direction of the vessel so that the course of the vessel will be determined by the condition of coincidence between the marks 30 and 34 in Fig. 3. For providing this control the shaft 37 is rotated by action of a worm wheel 83 and a screw 84. For setting the instrument to indicate direction of flying it is only necessary to set the vessel on its correct course and thereafter to turn the screw 84, and thereby also the magnets 62—65, until the mark 34 coincides with the mark 30. Thereafter the magnets may remain in this position and the vessel may be steered so that the mark 34 remains in registration with the mark 30. The screw 84 is preferably connected with a crank or wheel or the like on the same instrument panel with the scales of Fig. 3, and which may also carry a scale for indicating the setting of the gyro-arrangement. This connection may easily be established by means of a flexible shaft or by means of angle repeater motors, known per se.

The invention is not to be limited to the above embodiments but substantial modifications of the invention may be made without thereby departing from the scope of the invention.

The invention may be applied, for example, to an automatic zero setting mechanism or to an automatic steering mechanism. It should also be observed that the mechanical form of the magnetic circuits shown in the described embodiment of the invention does not limit the scope of the invention. For instance, the rotor part may have another form than the above described square form. The polarizing magnets need not necessarily be arranged in the manner described above. This embodiment was selected because their adjustment is simplified and a desirable mechanical form is obtained.

What is claimed is:

1. An earth inductor generator according to claim 3 in which the fixed parts of the magnetic paths are arranged in the form of two pairs of cores extending substantially radially in the same plane about the axis of rotation of the shaft of the common rotor member, the cores of each pair lying on the same side of a plane containing the axis of the rotating part and in which magnets are provided for polarization of the magnetic paths, said magnets being arranged in an inclined direction with relation to the plane of the cores and located between the outer ends of the two adjacent cores belonging to the respective magnetic paths to form a part of the return path.

2. An earth inductor generator according to claim 3 in which the fixed parts of the magnetic paths are arranged in the form of two pairs of cores extending substantially radially in the same plane about the axis of rotation of the shaft of the common rotor member, the cores of each pair lying on the same side of a plane containing the axis of the rotating part and in which magnets are provided for polarization of the magnetic paths, said magnets being arranged in an inclined direction with relation to the plane of said cores and located between the outer ends of the two adjacent magnet cores belonging to the respective magnetic paths to form a part of the return path, said polarized magnets being adjacent for providing adjustment of the intensity of the polarizing field.

3. An earth inductor generator comprising a rotor member composed of a single magnetic element rotating in a plane and stator members of magnetic material lying in said plane and cooperating with said rotor to form a pair of open magnetic paths adapted to be traversed by the earth's magnetic field, said paths passing through said rotor member in parallel spaced relationship, said rotor being of a shape adapted to periodically vary the reluctance of said paths, induced windings associated with said stator members and responsive to the effect of the earth's field on said paths, and magnetic members positioned to polarize said paths in opposite directions.

4. An earth inductor generator according to claim 3 in which the rotor member is substantially square and is provided with flattened corners and in which the stator members are arranged in the form of two pairs of cores extending substantially radially about the axis of rotation of said rotor member and registering in certain positions of said rotor with said flattened corners, the cores of each pair lying on the same side of a plane containing the axis of said rotor member.

HARALD VALDEMAR ALEXANDERSSON.
ADOLF STELLAN DAHLSTEDT.

REFERENCES CITED

The following references are of record in the file of this patent:

UNITED STATES PATENTS

| Number | Name | Date |
| --- | --- | --- |
| Re. 11,576 | Steinmetz | Nov. 24, 1896 |
| 587,090 | Sohlman | Jan. 11, 1898 |
| 1,956,350 | Hammond | Apr. 24, 1934 |
| 2,231,113 | Guenther | Feb. 11, 1941 |
| 2,355,047 | Bennett | Aug. 8, 1944 |
| 2,217,847 | Schulte | Aug. 23, 1938 |
| 1,051,373 | Milton | Jan. 21, 1913 |
| 1,819,488 | Titterington | Aug. 18, 1931 |
| 1,959,251 | Titterington | May 15, 1934 |
| 2,038,787 | Guerra | Apr. 28, 1936 |
| 2,025,897 | Reichel | Dec. 31, 1935 |
| 1,770,246 | Titterington | July 8, 1930 |

Certificate of Correction

Patent No. 2,432,500. December 16, 1947.

HARALD VALDEMAR ALEXANDERSSON ET AL.

It is hereby certified that errors appear in the printed specification of the above numbered patent requiring correction as follows: Column 6, lines 4 and 5, claim 2, for the word "adjacent" read *adjustable*; same column, list of references cited, under "UNITED STATES PATENTS," for "587,090" read *597,090*; and that the said Letters Patent should be read with these corrections therein that the same may conform to the record of the case in the Patent Office.

Signed and sealed this 30th day of March, A. D. 1948.

[SEAL]

THOMAS F. MURPHY,
*Assistant Commissioner of Patents.*